US010326793B2

(12) United States Patent
Wesie et al.

(10) Patent No.: US 10,326,793 B2
(45) Date of Patent: Jun. 18, 2019

(54) SYSTEM AND METHOD FOR GUARDING A CONTROLLER AREA NETWORK (71) Applicant: RunSafe Security, Inc., Washington, DC (US)

(72) Inventors: Andrew Michael Wesie, Austin, TX (US); Joseph Michael Saunders, Vienna, VA (US)

(73) Assignee: RUNSAFE SECURITY, INC., McLean, VA (US)

( * ) Notice: Subject to any disclaimer, the term of this patent is extended or adjusted under 35 U.S.C. 154(b) by 219 days.

(21) Appl. No.: 15/178,231

(22) Filed: Jun. 9, 2016

(65) Prior Publication Data
US 2016/0366178 A1 Dec. 15, 2016

Related U.S. Application Data (60) Provisional application No. 62/173,640, filed on Jun. 10, 2015.

(51) Int. Cl.
| | |
|---|---|
| *H04L 29/06* | (2006.01) |
| *G06F 21/55* | (2013.01) |
| *H04B 1/3822* | (2015.01) |
| *H04L 12/40* | (2006.01) |
| *B60R 16/023* | (2006.01) |
| *H04L 29/08* | (2006.01) |
| *H04L 12/24* | (2006.01) |

(52) U.S. Cl.
CPC .......... *H04L 63/1466* (2013.01); *G06F 21/55* (2013.01); *G06F 21/552* (2013.01); *G06F 21/554* (2013.01); *H04B 1/3822* (2013.01); *H04L 12/40032* (2013.01); *H04L 63/1416* (2013.01); *B60R 16/023* (2013.01); *H04L 41/069* (2013.01); *H04L 67/12* (2013.01); *H04L 2012/40215* (2013.01)

(58) Field of Classification Search
CPC . H04L 63/1466; H04L 63/1416; H04L 67/12; G06F 21/55; G06F 21/552; G06F 21/554; B60R 16/023
See application file for complete search history.

(56) References Cited

U.S. PATENT DOCUMENTS 5,764,919 A 6/1998 Hashimoto
2009/0265778 A1* 10/2009 Wahl .................. H04L 63/1416
726/13

(Continued)

OTHER PUBLICATIONS

Lin et al., "Cyber-Security for the Controller Area Network (CAN) Communication Protocol", pp. 1-7 (Year: 2012).*

(Continued)

*Primary Examiner* — Thaddeus J Plecha
(74) *Attorney, Agent, or Firm* — Wilmer Cutler Pickering Hale and Dorr LLP (57) ABSTRACT Systems and methods for guarding a controller area network are disclosed. In one embodiment, a system for guarding a controller area network comprises one or more processors. The one or more processors may be configured to receive a message destined for the controller area network. The one or more processors may further be configured to determine whether the message is legitimate. The one or more processors may further be configured to modify the message, if the message is determined as illegitimate, as an error message.

20 Claims, 9 Drawing Sheets

(56) References Cited

U.S. PATENT DOCUMENTS

| | | | |
|---|---|---|---|
| 2013/0104231 A1* | 4/2013 | Niner | H04L 63/1416 726/23 |
| 2013/0218412 A1 | 8/2013 | Ricci | |
| 2014/0277918 A1* | 9/2014 | Kim | G07C 5/008 701/31.5 |
| 2015/0020152 A1 | 1/2015 | Litichever et al. | |
| 2015/0089236 A1 | 3/2015 | Han et al. | |
| 2015/0113638 A1* | 4/2015 | Valasek | H04L 63/1408 726/22 |
| 2015/0191135 A1 | 7/2015 | Ben Noon et al. | |
| 2015/0191136 A1 | 7/2015 | Ben Noon et al. | |
| 2015/0191151 A1 | 7/2015 | Ben Noon et al. | |
| 2015/0195297 A1 | 7/2015 | Ben Noon et al. | |
| 2016/0149934 A1* | 5/2016 | Frank | H04L 12/40032 726/23 |
| 2016/0344766 A1* | 11/2016 | Lawlis | H04L 63/1466 |
| 2017/0013006 A1* | 1/2017 | Ujiie | H04L 12/6418 |
| 2018/0227306 A1* | 8/2018 | Borkowicz | H04L 63/101 |

OTHER PUBLICATIONS

Matsumoto et al., "A Method of Preventing Unauthorized Data Transmission in Controller Area Network", 5 pages (Year: 2012).*

International Search Report and Written Opinion issued by the U.S. Patent and Trademark Office as International Searching Authority for International Application No. PCT/US16/36677 dated Sep. 1, 2016 (7 pages).

Koscher, K., "Securing Embedded Systems: Analyses of Modern Automotive Systems and Enabling Near-Real Time Dynamic Analysis," Diss. University of Washington, 141 pgs. (2014); downloaded from https://digital.lib.washington.edu/researchworks/bitstream/handle/1773/26024/Koscher_washington_0250E_13805.pdf on Jun. 9, 2016.

Koscher, et al., "Experimental Security Analysis of a Modern Automobile," 2010 IEEE Symposium on Security and Privacy, pp. 1-16 (May 2010).

Checkoway, et al., "Comprehensive Experimental Analyses of Automotive Attack Surfaces," USENIX Security Symposium, 16 pgs. (2011).

* cited by examiner

```
[GL] Phy: activate VN_Primary/Triggering
[GL] Wait VN_Primary/Triggering
[RG1f11-[GL] AOA_DEACTIVATE_FLAG is set to TRUE
[GL]UnRequested Resp.0xee should not be delivered to VCP
[RG1f11-[GL]-Byte Interval Timeout. Continue
[RG1f11-[RG1f11-[GL]UnRequested Resp.0x60 should not be delivered to VCP
[GL]UnRequested Resp.0x60 should not be delivered to VCP
```

SYSTEM AND METHOD FOR GUARDING A CONTROLLER AREA NETWORK

CROSS-REFERENCE TO RELATED APPLICATIONS

This application claims the benefit of U.S. Provisional Patent Application No. 62/173,640, filed Jun. 10, 2015, entitled "Controller Area Network (CAN) Bus," which is hereby incorporated by reference herein in its entirety.

FIELD OF THE DISCLOSURE

The system and method of present disclosure pertains to guarding a controller area network by manipulating a message determined as illegitimate such that the message is recognized as an error message and dropped by nodes across the controller area network.

BACKGROUND OF THE DISCLOSURE

The state of the art in cyber-attacks against automobiles and automotive systems has been well summarized in academic research (see e.g., https://digital.lib.washington.edu/researchworks/bitstream/handle/1773/26024/Koscher_washington_0250E_13805.pdf, http://www.autosec.org/pubs/cars-oakland2010.pdf, and http://www.autosec.org/pubs/cars-usenixsec2011.pdf). Attackers are using the design features of in-vehicle communications networks to interfere with safe and normal vehicle (including cars and trucks of all classes) operations.

The chief in-vehicle network deployed in the United States and globally is the controller area network (CAN) bus, which is one of the five protocols used in the on-board diagnostics (OBD)-II vehicle diagnostics standard. OBD-II has been required on vehicles sold in the United States since 1996. Europe adopted a similar standard in 2001 for gas powered vehicles and 2004 for diesel vehicles.

The CAN bus system was designed to handle safety issues; however, it does not take into account the possibility of an adversary, deliberately using the system for unauthorized purposes (see e.g., http://www.autosec.org/pubs/cars-oakland2010.pdf). Researchers have demonstrated attacks that allow malicious actors to manipulate the brakes in a moving car, manipulate the engine, and cause other dangerous scenarios (see e.g., http://www.autosec.org/pubs/cars-oakland2010.pdf and http://www.autosec.org/pubs/cars-usenixsec2011.pdf).

SUMMARY OF THE DISCLOSURE

Systems and methods for guarding a controller area network are disclosed. In one embodiment, a system for guarding a controller area network comprises one or more processors. The one or more processors may be configured to receive a message destined for the controller area network. The one or more processors may further be configured to determine whether the message is legitimate. The one or more processors may further be configured to modify the message, if the message is determined as illegitimate, as an error message.

In accordance with other aspects of this embodiment, the one or more processors may further be configured to modify the message by injecting six consecutive dominant bits.

In accordance with other aspects of this embodiment, the one or more processors may further be configured to inject the six consecutive dominant bits before an end of the message as soon as a portion of the message indicates the message as illegitimate.

In accordance with other aspects of this embodiment, the one or more processors may further be configured to determine whether the message is legitimate at line-speed.

In accordance with other aspects of this embodiment, the controller area network may be an in-vehicle network.

In accordance with other aspects of this embodiment, the one or more processors may further be configured to, if the message is determined as illegitimate, alert a driver of a vehicle for which the in-vehicle network is installed.

In accordance with other aspects of this embodiment, the one or more processors may further be configured to log information regarding messages transmitted across the controller area network.

In accordance with other aspects of this embodiment, the one or more processors may further be configured to transmit the logged information to an external module.

In accordance with other aspects of this embodiment, the one or more processors may further be configured to transmit the logged information via an infrared reader.

In another embodiment, a method for guarding a controller area network is disclosed. According to the method, a message destined for the controller area network may be received. Whether the message is legitimate may be determined. If the message is determined as illegitimate, the message may be modified as an error message.

In still another embodiment, a non-transitory computer readable medium storing a computer-readable program for guarding a controller area network is disclosed. The program may include computer-readable instructions to receive a message destined for the controller area network. The program may further include computer-readable instructions to determine whether the message is legitimate. The program may further include computer-readable instructions to modify the message, if the message is determined as illegitimate, as an error message.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

The present disclosure addresses the problems of the past by providing a system that could mitigate in-vehicle threats without requiring massive changes to the car's hardware in design, pre-sales, or after-market. Additionally, the CAN bus system of the present disclosure may allow for diagnostic and maintenance operations to be performed while it is installed.

Figure 1:
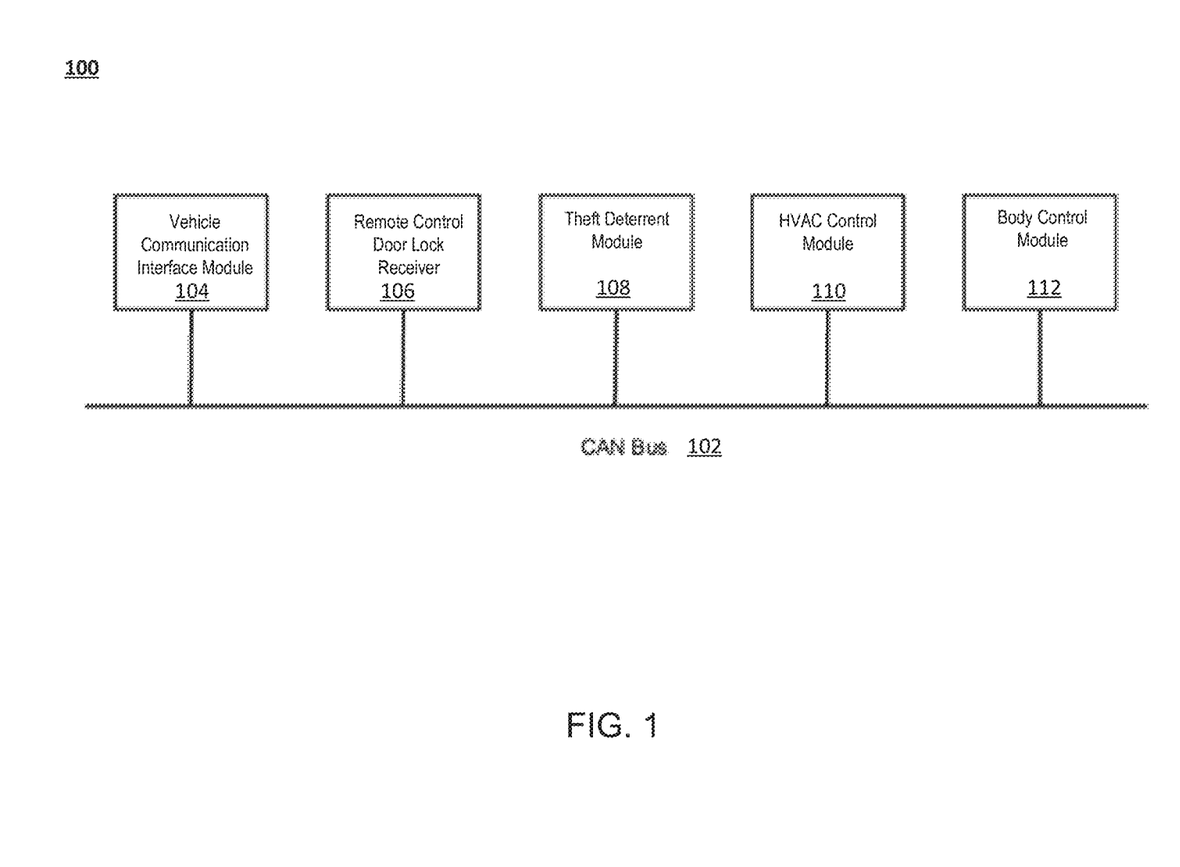
FIG. 1 shows a basic implementation of a CAN bus.

FIG. 1 shows a basic implementation of a CAN bus. Preferably, a CAN bus is a system designed to relay signals between modules in a vehicle. As shown in FIG. 1, Controller Area Network 100 comprises CAN bus 102, Vehicle Communication Interface Module 104, Remote Control Door Lock Receiver 106, Theft Deterrent Module 108, HVAC Control Module 110, and Body Control Module 112. 104/106/108/110/112 are various exemplary nodes in a controller Area Network 100.

Figure 2:
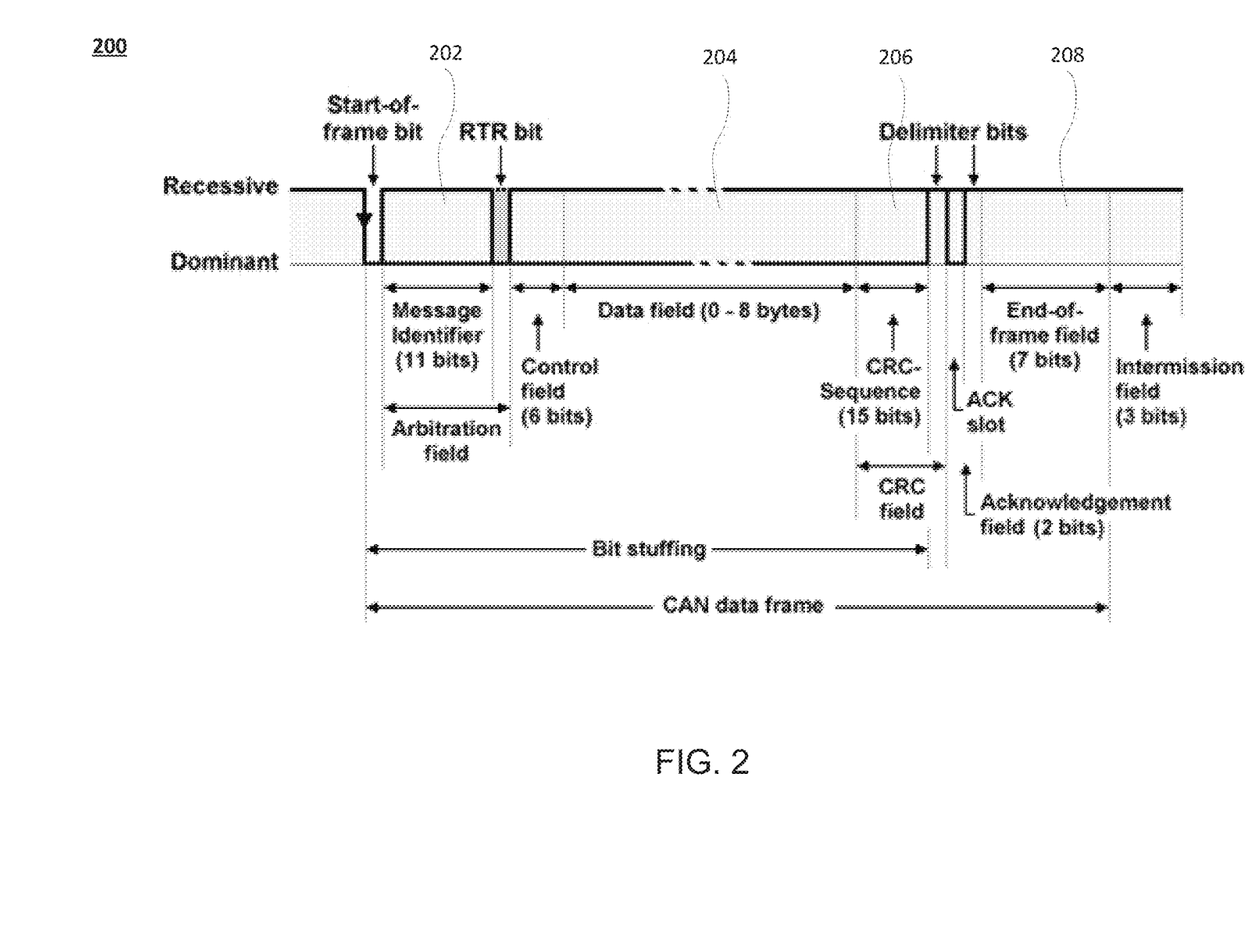
FIG. 2 shows an example CAN bus signal transmission for a CAN network.

FIG. 2 shows an example CAN bus signal transmission for a CAN network. The signal (i.e., message) 200, as shown in FIG. 2 may include a number of standardized segments, including a Message Identifier 202 at the beginning, a Data Field 204 in the middle, and a Cyclic Redundancy Check ("CRC") Sequence 206 and an End-of-Frame Field 208 at the end. Each of these segments is formed by "bits," which oscillate the CAN bus between the "0" state (dominant) and the "1" state (recessive). The pattern of dominant and recessive bits determines the content of the signal and as the CAN bus executes transmissions, each module connected to the bus receives these transmissions almost simultaneously. The module to which the signal is addressed then executes the command, while the remaining modules disregard it.

Because the CAN bus has only one data wire used for effecting transmissions to, and receiving transmissions from, each of the connected modules, each CAN bus may be limited to a single transmission at any given time and each transmission is limited to a single message, and a dominant transmission overrides any ongoing recessive transmission. Every device connected to the CAN bus cooperates by having the same conflict and error handling protocols. In the event of an error in a transmission, six dominant bits may be sent in succession to signify the error. Each normally functioning module on the CAN bus will then drop the message and ignore its content.

Figure 3:
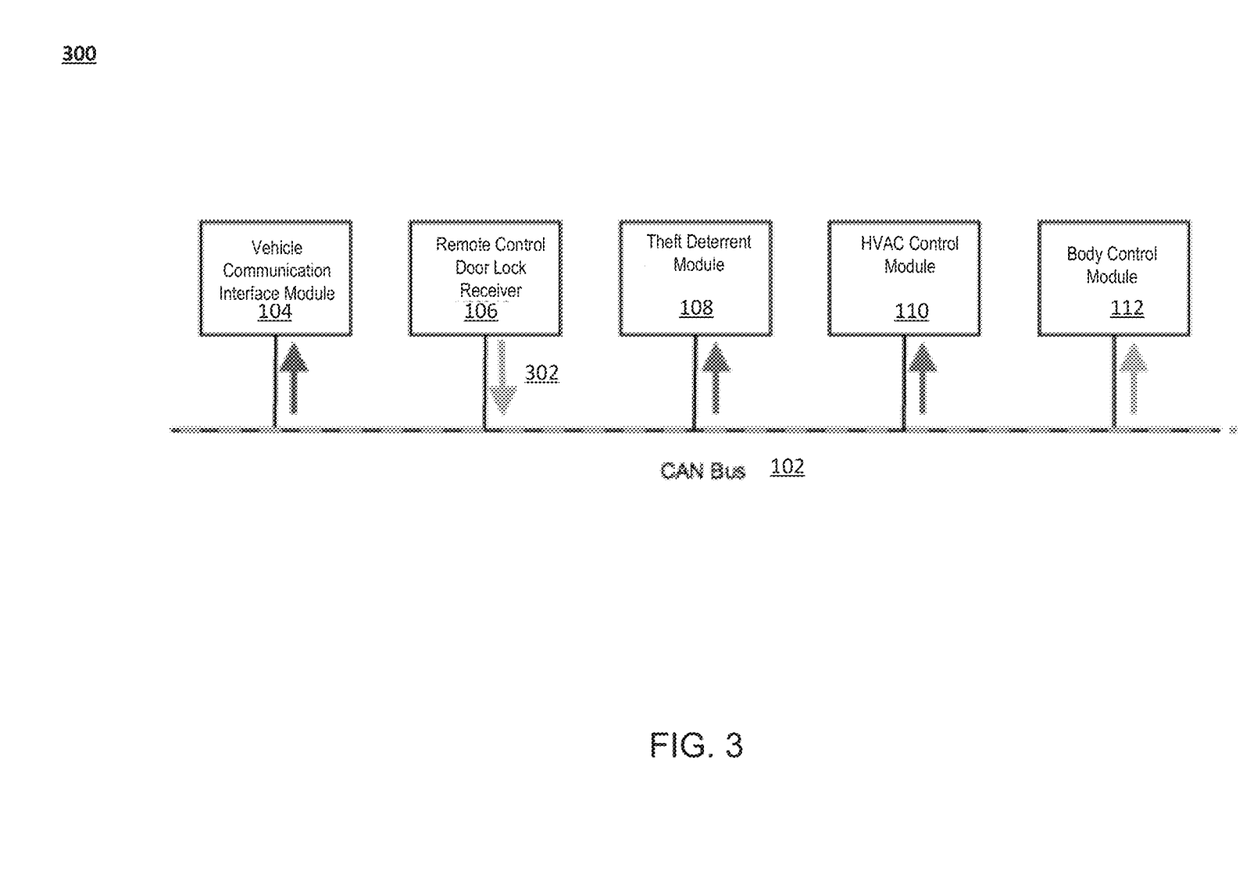
FIG. 3 shows a normal CAN bus operation.

FIG. 3 shows a normal CAN bus operation. In a normal CAN bus operation, as seen in FIG. 3, an authentic signal 302, which, for example, may be a signal from the Remote Control Door Lock Receiver Module 106, is transmitted via the CAN bus 102 to all attached modules 104/108/110/112 in the form of a combination of dominant and recessive bits. The intended recipient of the signal, which, for example, may be the Body Control Module ("BCM") 112, executes the legitimate signal's instructions, such as unlock the vehicle's doors, while the remaining modules disregard the signal (e.g., modules 104/108/110). The effects of these signals can range from basic electronic actions to diagnostic messages with the potential to disable crucial vehicle systems, such as the capability to apply the brakes.

Figure 4:
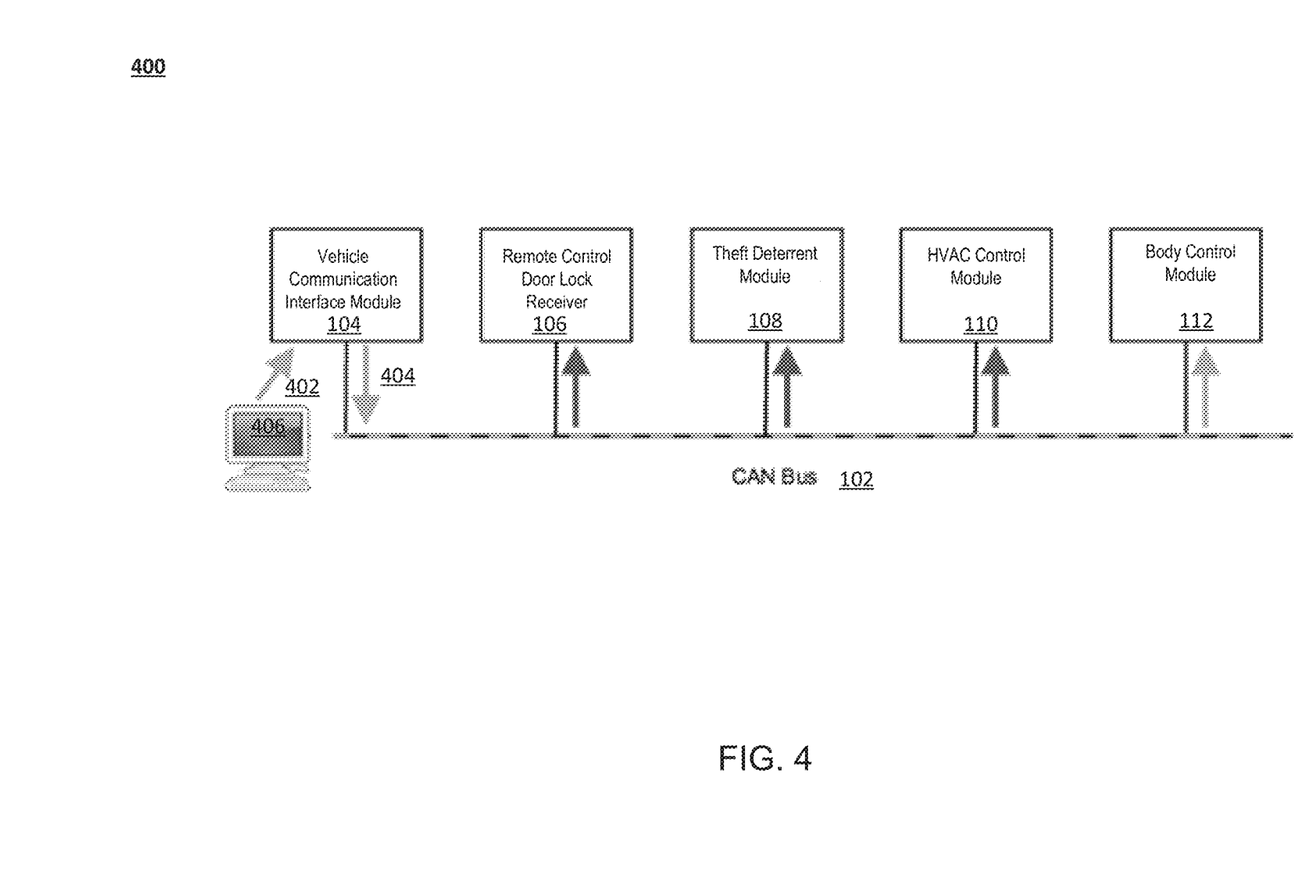
FIG. 4 shows an unauthorized (attacking) CAN bus signal transmission.

FIG. 4 shows an unauthorized (attacking) CAN bus signal transmission. FIG. 4 depicts a typical mechanism through which an attacker can remotely exert control over the functionality of a vehicle. The Vehicle Communication Interface Module ("VCIM") 104 provides the vehicle with a satellite connection used, among other functions, to allow for GPS navigation and OnStar or related services. Taking advantage of this telematics unit, an attacker may gain access to the internal CAN bus system and prompt the VCIM 102 to transmit unauthorized attacking messages. As shown in FIG. 4, an attacker may send an illegitimate (e.g., malicious) signal 402 to Vehicle Communication Interface Module 104. The attack may be initiated from system 406. Vehicle Communication Interface Module 104 may then send an illegitimate signal to the controller area network through CAN bus 102. Body Control Module 112 may execute the illegitimate signal 404 and the corresponding instructions. The remaining modules may disregard the signal (e.g., modules 106/108/110).

Because the CAN bus is designed as a closed system, signals transmitted by the attached modules are implicitly trusted and considered authentic. An attacker able to access one such module may have the capacity to freely transmit any electronic instructions executable by the other modules across the entirety of the CAN bus without hindrance or verification processes. As such, a majority of these types of attacks are in the form of diagnostic messages transmitted by the VCIM 104 to the BCM 112, instructing the BCM 112 to execute an action, such as activating windshield wipers, turning on the vehicle horn, or preventing application of the brakes.

Figure 5:
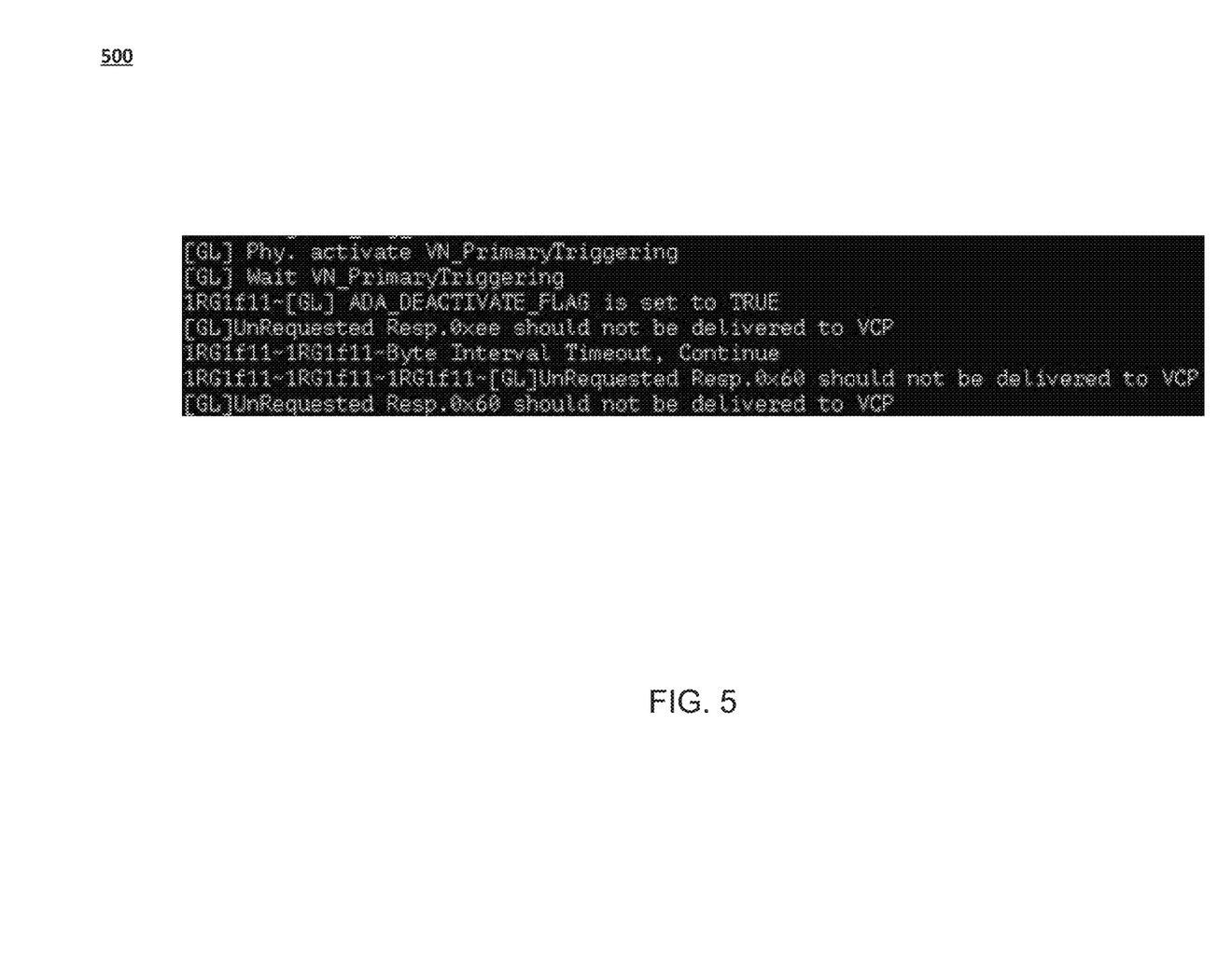
FIG. 5 shows an example response from a module on a controller area network indicating an effective attack.

FIG. 5 shows an example response from a module on a controller area network indicating an effective attack. FIG. 5 depicts a representation example of an unauthorized signal prompted by an attacker being sent by the VCIM to the BCM, and the response by the BCM indicating the illegitimate signal reached the target module.

Figure 6:
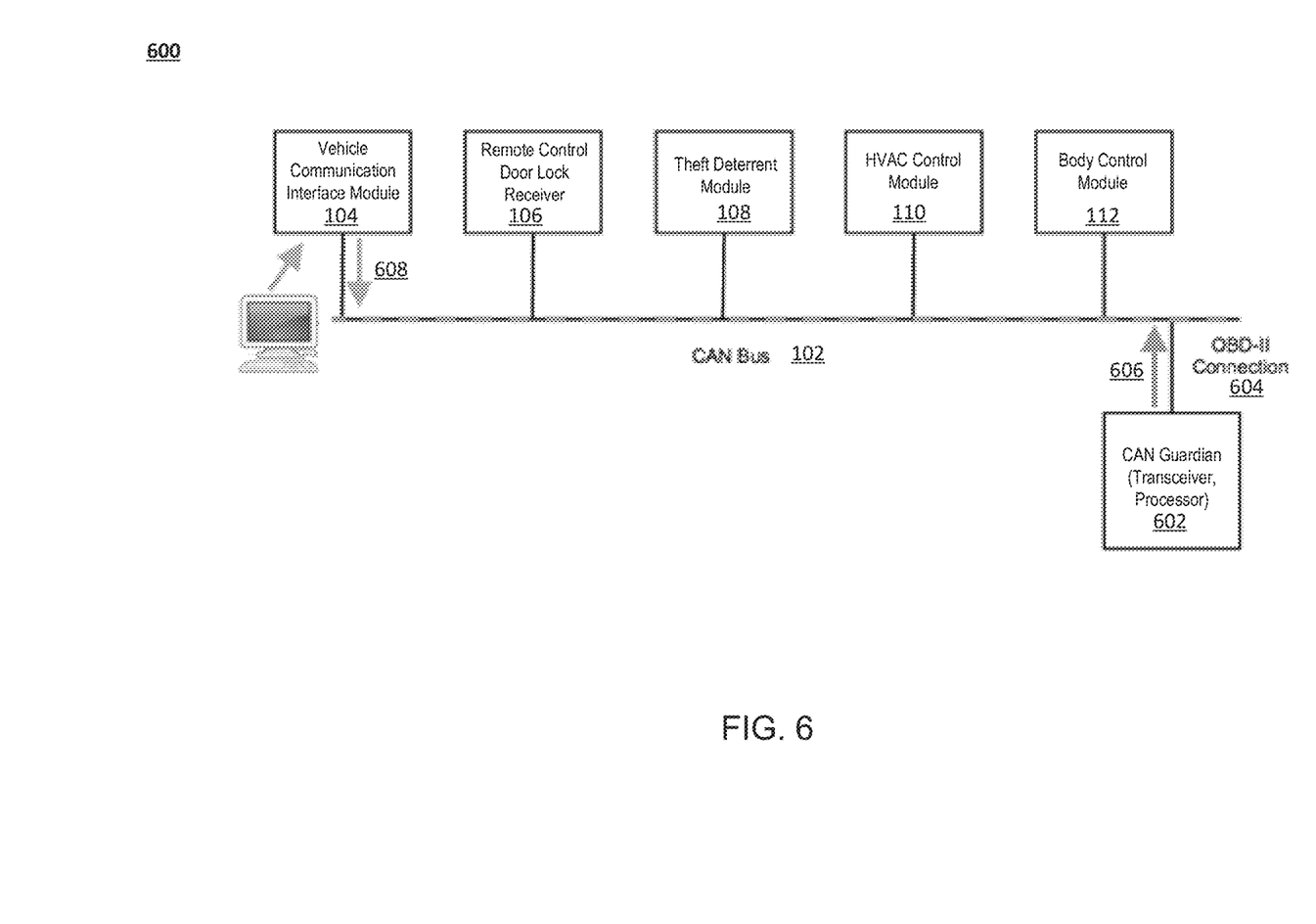
FIG. 6 shows an attempted remote attack on a vehicle being thwarted by the CAN guardian system, in accordance with an embodiment of the present disclosure.

FIG. 6 shows an attempted remote attack on a vehicle being thwarted by the CAN guardian system, in accordance with an embodiment of the present disclosure. In one embodiment, the CAN guardian may be an OBD-II dongle 602 that prevents certain diagnostic commands from being transmitted across the CAN bus 102. It can be analogized to a stateless firewall filter with the ability to block or allow individual packets. Unlike past traditional firewalls that are placed between two networks, the CAN guardian of the present disclosure may block packets internally, e.g., on a single CAN bus 102, rather than acting in between networks. Because of the CAN bus architecture, the CAN guardian is capable of providing filtering for all of the devices connected to the bus without being placed between a misused module, such as the VCIM 104, and the targeted module, such as the BCM 112. This system feature gives the CAN guardian a one-to-many property, that is, one CAN guardian can protect all modules (e.g., 104/106/108/110/112) on the CAN bus. This differs from conventional practices that are one-to-one solutions, this is, one filter protects on CAN bus module.

In some embodiments, the CAN guardian 602 is capable of incorporating a pass-through OBD-II port 604 so that mechanics, service personnel, and others may work on the vehicle with the CAN guardian installed and send diagnostic messages. While a diagnostic device is connected into the pass-through OBD-II port 604, the CAN guardian may not filter CAN bus traffic. Alternatively, service personnel may remove the CAN guardian from the OBD-II port and connect their diagnostic equipment.

In some embodiments, when the CAN guardian of the present disclosure detects an illegitimate signal 606 or 608, it may intentionally inject an error message of six dominant bits. All normally functioning modules (e.g., 104/106/108/110/112) on the CAN bus 102 may interpret this series of dominant bits as an error state causing all modules on the bus to drop the transmission (i.e., disregard the signal 606 or 608). In some embodiments, the CAN guardian is capable of monitoring simultaneously multiple CAN bus systems operating on a single vehicle. The mitigation methods as described herein may be configured to vary for each CAN bus operating on a vehicle. The CAN guardian may also support multiple messaging protocols, including J1939.

In some embodiments, the CAN guardian may log event data including total message counts, bad messages detected, messages blocked, and many other data points. Additionally, when a message is blocked, event data and meta data about the event such as date, time, preceding messages, and other information may be recorded.

In some embodiments, CAN bus 102 may be configured to record the preceding control messages prior to a system going idle. This data may state what was happening on a vehicle prior to shutting off, such as excessive speeding or abrupt braking.

In some embodiments, the CAN guardian may use an infrared reader to transmit logged data from a single unit to an external software module for analysis.

In some embodiments, the CAN guardian can be embedded into the CAN bus by a manufacturer rather than operating as a device connected via the OBD-ii port 604.

In some embodiments, the CAN guardian works in non-vehicle environments that operate CAN bus, such as naval ships. In other words, the application of techniques associated with the present disclosure is not limited to vehicles.

Figure 7:
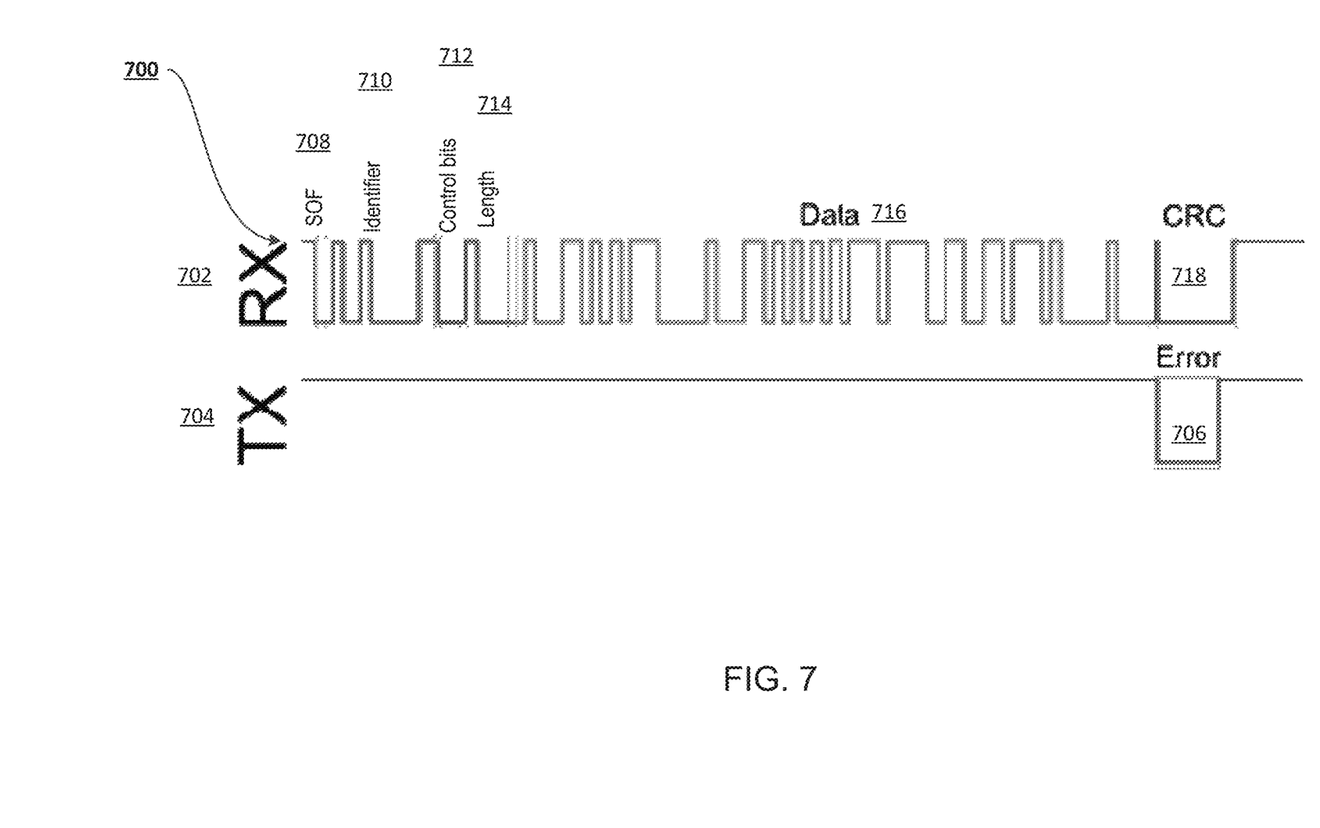
FIG. 7 shows an example mechanism for which an illegitimate signal is recognized and modified as an error signal, in accordance with an embodiment of the present disclosure.

FIG. 7 shows an example mechanism for which an illegitimate signal is recognized and modified as an error signal, in accordance with an embodiment of the present disclosure. FIG. 7 demonstrates an illegitimate signal 700 transmitted on the bus in a real environment 702, along with the signal sent by the CAN guardian in a test environment 704 that coaxes the triggering of an error test in order to trigger an error. As shown in FIG. 7, the error 706 (e.g., 6 consecutive dominant bits) may be injected at the "right time," i.e., after the receipt of enough fields so the decision can be made, but before the end of the packet. In other words, in one embodiment, as shown in FIG. 7, after analyzing Start of Frame 708, Identifier 710, Control bit 712, Length 714, and Data 716, a decision may be made that the signal 700 is illegitimate. Without analyzing CRC 718, Error 706 may then be injected into the signal 700. In some embodiments, in order to inject the errors, the CAN guardian may analyze the transmitted packet and make a determination of its legitimacy at line-speed.

Because Commercial off-the-shelf ("COTS") CAN controllers buffer packets and inhibit their corruption, the CAN guardian may re-implement the CAN protocol, preferably, using an XMOS processor. The basic structure of such an implementation is that it has two state machines: one is responsible for clock synchronization and turning digital signals into individual bits, and the second is responsible for decoding those bits as a CAN bus message. In one embodiment, upon decoding the arbitration ID 710 and data fields 716, the CAN guardian determines the legitimacy of the packet/signal 700 and whether or not it should be blocked via the transmission of an error message.

The CAN guardian may determine a message's legitimacy in several ways. First, if a diagnostic message originates from somewhere other than the diagnostic port on the CAN guardian (e.g., the diagnostic port of the CAN), then that message may be considered an illegitimate message. The CAN guardian may be programmed with additional messages that have been learned to cause damage or interfere with safe vehicle driving operations. The CAN guardian may also be updated wirelessly or wired. During such an update, the CAN guardian would learn of new potentially dangerous messages that need to be filtered.

Figure 8:
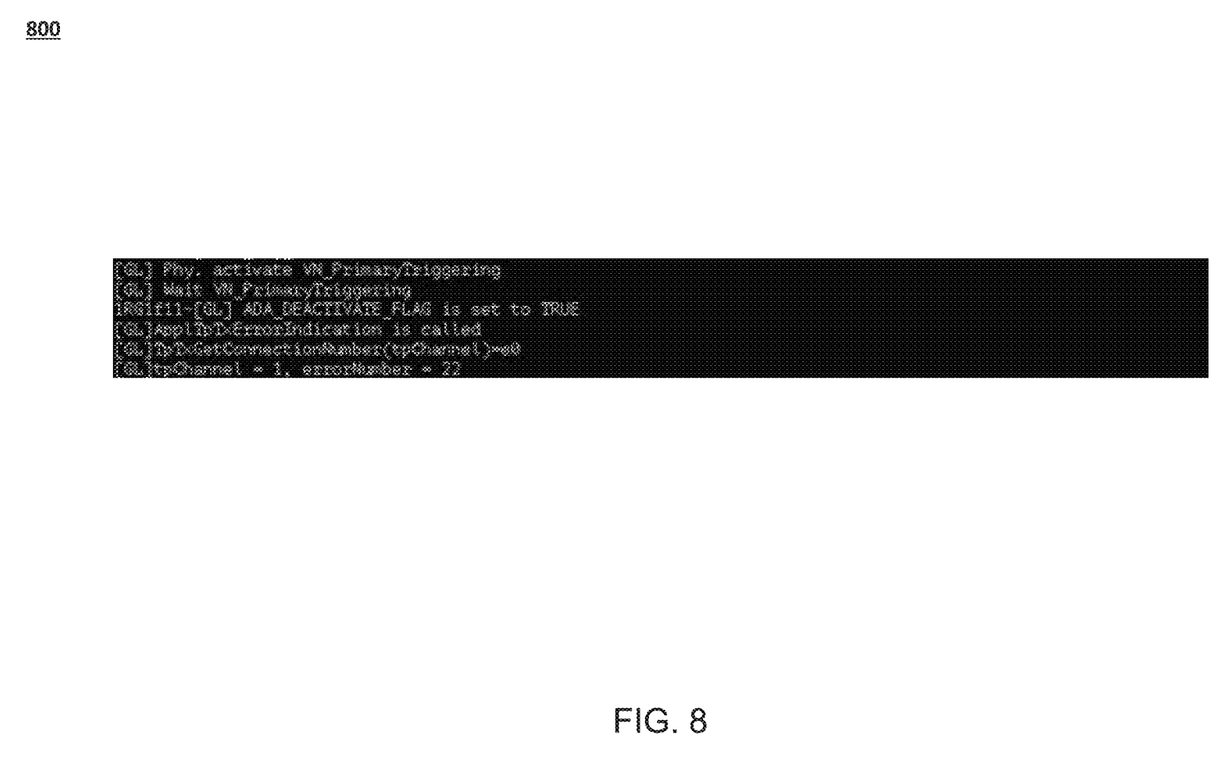
FIG. 8 shows an example error response indicating an unsuccessful attack, in accordance with an embodiment of the present disclosure.

FIG. 8 shows an example error response indicating unsuccessful attack, in accordance with an embodiment of the present disclosure. FIG. 8 depicts the result of an attempted attack thwarted by the CAN guardian of the present disclosure returning an error message that indicates the illegitimate signal was not successfully transmitted to the target module. As described above and shown in FIG. 8, in some embodiment, upon the CAN guardian's transmission of an error signal to interrupt an illegitimate attacking transmission, every correctly behaving CAN device connected to the network will drop the packet and the sender will be forced to retry their transmission. If every retransmission are continually blocked, the attacker will eventually give up.

In some embodiments, additionally the CAN guardian may alert the vehicle driver via an audible alert, email, or visual signal that an attempt has been made to transmit an illegitimate message on the CAN bus. The driver will thus be able to make a decision about the safety risk and the action to take, e.g., stop the vehicle or have the vehicle serviced. The main issue is that the driver has been apprised of attempt and without the illegitimate CAN bus message achieving its goal of triggering an unauthorized action in the vehicle.

With the CAN guardian installed, this procedure might result in no messages being accepted if an attacker floods the network. The alternative, however, is the attacker gaining the capability to negatively subvert and influence the vehicle's electronic systems.

Features of CAN guardian include, but are not limited to, the following: 1) using a single OBD-II dongle to provide a diagnostic message filter for the entire CAN bus. This works, because the CAN bus works in essentially a common message broadcast architecture. 2) The CAN guardian not only identifies risky diagnostic messages, it blocks them. 3) The CAN guardian may be installed or removed by anyone of any skill level.

Figure 9:
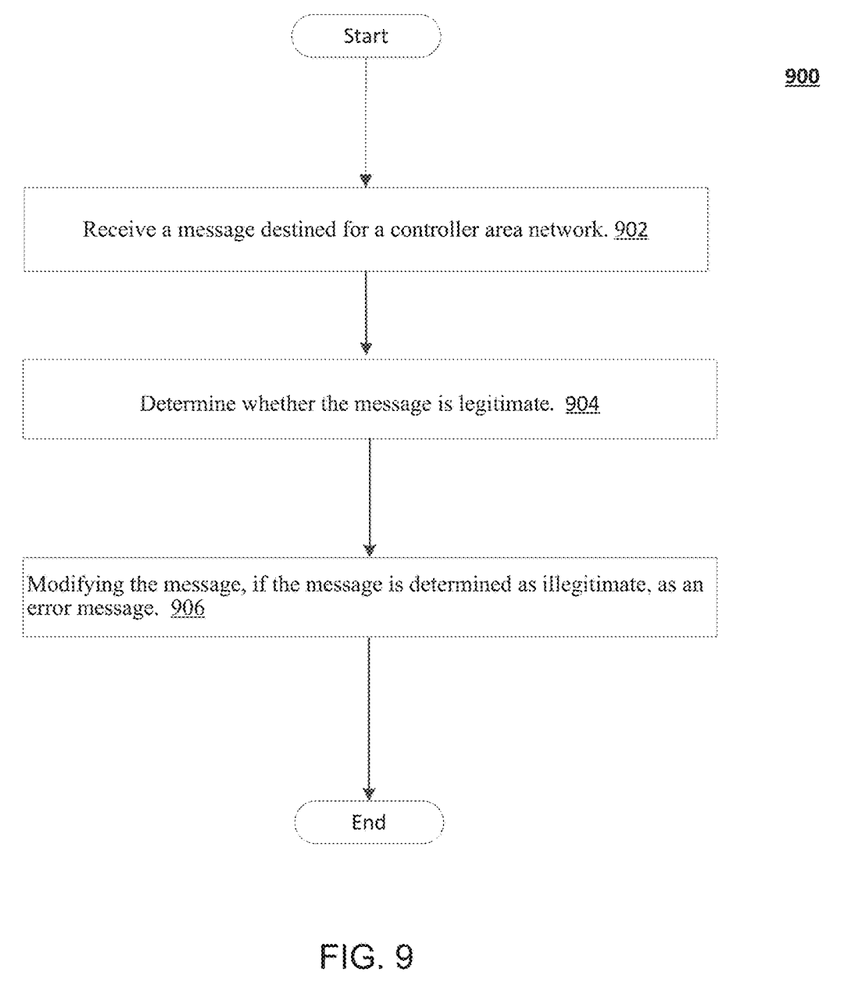
FIG. 9 shows a flowchart for guarding a controller area network, in accordance with an example method of the present disclosure.

FIG. 9 shows a flowchart for guarding a controller area network, in accordance with an example method of the present disclosure. Method 900 may include receiving a message destined for a controller area network (902), determining whether the message is legitimate (904), and modifying the message, if the message is determined as illegitimate, as an error message (906).

Method 900 may include receiving a message destined for a controller area network (902). As described above, in one embodiment, the message may be received through an OBD-II port. In another embodiment, the message may be received from an external system, via the Vehicle Communication Interface Module.

Method 900 may also include determining whether the message is legitimate (904). In one embodiment, a portion of the message is examined and analyzed. In some embodiments, the CAN guardian may be updated such that the CAN guardian would learn of new potentially dangerous messages that need to be filtered.

Method 900 may also include modifying the message, if the message is determined as illegitimate, as an error message (906). In one embodiment, six consecutive dominant bits are injected into the message such that nodes on the controller area network recognize the modified message as an error message and drop the message. In some embodiments, as described above, the six consecutive dominant bits are injected just-in-time as soon as a portion of the message analyzed indicates the message as illegitimate.

The embodiments or portions thereof of the system and method of the present disclosure may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present disclosure described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present disclosure is not intended to be limited to the embodiments shown or described herein.

The invention claimed is:

1. A system for guarding a controller area network (CAN), comprising one or more hardware processors configured to:
   receive a message destined for the CAN;
   determine, by a CAN guardian, whether the message is legitimate by analyzing, without checking a cyclic redundancy check sequence of the message, a start of frame, an identifier, a control bit, a length, and a data bit of the message, wherein the CAN guardian incorporates a pass-through port connected to the CAN to allow a diagnostic device to communicate with the CAN; and
   modify the message, if the message is determined as illegitimate, as an error message.

2. The system of claim 1, wherein the one or more hardware processors are further configured to modify the message by injecting six consecutive dominant bits.

3. The system of claim 2, wherein the one or more hardware processors are further configured to inject the six consecutive dominant bits before an end of the message as soon as a portion of the message indicates the message as illegitimate.

4. The system of claim 1, wherein the one or more hardware processors are further configured to determine whether the message is legitimate at line-speed.

5. The system of claim 1, wherein the CAN is an in-vehicle network.

6. The system of claim 5, wherein the one or more hardware processors are further configured to, if the message is determined as illegitimate, alert a driver of a vehicle for which the in-vehicle network is installed.

7. The system of claim 1, wherein the one or more hardware processors are further configured to log information regarding messages transmitted across the CAN.

8. The system of claim 7, wherein the one or more hardware processors are further configured to transmit the logged information to an external module.

9. The system of claim 8, wherein the one or more hardware processors are further configured to transmit the logged information via an infrared reader.

10. A method for guarding a controller area network (CAN), comprising:
    receiving a message destined for the CAN;
    determining, by a CAN guardian, whether the message is legitimate by analyzing, without checking a cyclic redundancy check sequence of the message, a start of frame, an identifier, a control bit, a length, and a data bit of the message, wherein the CAN guardian incorporates a pass-through port connected to the CAN to allow a diagnostic device to communicate with the CAN; and
    modifying the message, if the message is determined as illegitimate, as an error message.

11. The method of claim 10, further comprising modifying the message by injecting six consecutive dominant bits.

12. The method of claim 11, further comprising injecting the six consecutive dominant bits before an end of the message as soon as a portion of the message indicates the message as illegitimate.

13. The method of claim 10, further comprising determining whether the message is legitimate at line-speed.

14. The method of claim 10, wherein the CAN is an in-vehicle network.

15. The method of claim 14, further comprising, if the message is determined as illegitimate, alerting a driver of a vehicle for which the in-vehicle network is installed.

16. The method of claim 10, further comprising logging information regarding messages transmitted across the CAN.

17. The method of claim 16, further comprising transmitting the logged information to an external module.

18. The method of claim 17, further comprising transmitting the logged information via an infrared reader.

19. A non-transitory computer readable medium storing a computer-readable program for guarding a controller area network (CAN), comprising:
- computer-readable instructions to receive a message destined for the CAN;
- computer-readable instructions to determine, by a CAN guardian, whether the message is legitimate by analyzing, without checking a cyclic redundancy check sequence of the message, a start of frame, an identifier, a control bit, a length, and a data bit of the message, wherein the CAN guardian incorporates a pass-through port connected to the CAN to allow a diagnostic device to communicate with the CAN; and
- computer-readable instructions to modify the message, if the message is determined as illegitimate, as an error message.

20. The non-transitory computer readable medium according to claim 19, further comprising computer-readable instructions to modify the message by injecting six consecutive dominant bits.

\* \* \* \* \*